United States Patent
Bräuning et al.

(10) Patent No.: US 12,241,396 B2
(45) Date of Patent: Mar. 4, 2025

(54) EXHAUST-GAS TREATMENT ARRANGEMENT

(71) Applicant: Purem GmbH, Neunkirchen (DE)

(72) Inventors: Silas Bräuning, Denkendorf (DE); Wolfgang Datz, Tuebingen (DE); Markus Henzler, Grafenberg (DE); Oleksandr Velyaev, Stuttgart (DE); Tobias Wolf, Koengen (DE); Arthur Wieland, Baltmannsweiler (DE)

(73) Assignee: Purem GmbH, Neunkirchen (DE)

( * ) Notice: Subject to any disclaimer, the term of this patent is extended or adjusted under 35 U.S.C. 154(b) by 7 days.

(21) Appl. No.: 18/528,551

(22) Filed: Dec. 4, 2023

(65) Prior Publication Data
US 2024/0183299 A1 Jun. 6, 2024

(30) Foreign Application Priority Data
Dec. 5, 2022 (DE) ...................... 10 2022 132 122.3

(51) Int. Cl.
*F01N 3/20* (2006.01)
*B01D 53/94* (2006.01)
(Continued)

(52) U.S. Cl.
CPC ....... *F01N 3/2033* (2013.01); *B01D 53/9418* (2013.01); *B01D 53/9436* (2013.01);
(Continued)

(58) Field of Classification Search
CPC .... F01N 13/009; F01N 3/2033; F01N 3/2066; F01N 3/2892; F01N 2610/02;
(Continued)

(56) References Cited

U.S. PATENT DOCUMENTS

| 6,050,088 A | 4/2000 | Brenner |
| 8,607,551 B2 | 12/2013 | Nagaoka et al. |

(Continued)

FOREIGN PATENT DOCUMENTS

| DE | 197 38 859 A1 | 3/1999 |
| DE | 10 2005 006 426 A1 | 8/2006 |

(Continued)

*Primary Examiner* — Kenneth J Hansen
*Assistant Examiner* — Kelsey L Stanek
(74) *Attorney, Agent, or Firm* — Walter Ottesen, P.A.

(57) ABSTRACT

An exhaust-gas treatment arrangement for an exhaust-gas system of a combustion engine has a first exhaust-gas treatment unit and, downstream thereof, an exhaust-gas treatment assembly. The treatment unit and the treatment assembly are arranged axially one after the other in the direction of a flow-path longitudinal axis of a flow path including the treatment unit and the treatment assembly. A hydrocarbon introducer for introducing hydrocarbon into exhaust gas flowing in the flow path is in the flow path substantially axially between the treatment unit and the treatment assembly. The hydrocarbon introducer includes an introduction ring flow channel annularly surrounding the flow-path longitudinal axis. The channel is open in an upstream end region toward an outlet region of the treatment unit and is open in a downstream end region toward an inlet region of the treatment assembly. The hydrocarbon introduction assembly includes a discharging unit for discharging hydrocarbon into the channel.

22 Claims, 3 Drawing Sheets

(51) Int. Cl.
*B01F 25/30* (2022.01)
*B01F 25/431* (2022.01)
*F01N 3/28* (2006.01)
*F01N 13/00* (2010.01)

(52) U.S. Cl.
CPC ............ *B01D 53/944* (2013.01); *B01F 25/30* (2022.01); *B01F 25/431* (2022.01); *F01N 3/2066* (2013.01); *F01N 3/2892* (2013.01); *F01N 13/009* (2014.06); *B01D 2251/2067* (2013.01); *B01D 2251/208* (2013.01); *B01D 2257/404* (2013.01); *B01D 2257/406* (2013.01); *B01D 2258/012* (2013.01); *F01N 2610/02* (2013.01); *F01N 2610/03* (2013.01)

(58) Field of Classification Search
CPC .... F01N 2610/03; B01F 25/30; B01F 25/431; B01D 53/9418; B01D 53/9436; B01D 53/944; B01D 2251/2067; B01D 2251/208; B01D 2257/202; B01D 2257/206; B01D 2258/012

USPC .......................................................... 60/320
See application file for complete search history.

(56) References Cited

U.S. PATENT DOCUMENTS

| | | |
|---|---|---|
| 8,763,369 B2 | 7/2014 | Li et al. |
| 11,268,420 B2 | 3/2022 | Voss et al. |
| 2009/0004082 A1 | 1/2009 | Takahashi et al. |
| 2010/0199643 A1* | 8/2010 | Yacoub ................. F01N 13/009 60/299 |
| 2014/0318112 A1* | 10/2014 | Solbrig ................... F01N 3/208 60/324 |
| 2016/0348557 A1* | 12/2016 | Dalimonte ............ F01N 3/2066 |
| 2018/0149060 A1 | 5/2018 | Hehle et al. |

FOREIGN PATENT DOCUMENTS

| | | |
|---|---|---|
| DE | 10 2015 208 016 A1 | 11/2016 |
| WO | 2021/203154 A1 | 10/2021 |

* cited by examiner

EXHAUST-GAS TREATMENT ARRANGEMENT

CROSS-REFERENCE TO RELATED APPLICATIONS

This application claims priority of German patent application no. 10 2022 132 122.3, filed Dec. 5, 2022, the entire content of which is incorporated herein by reference.

TECHNICAL FIELD

The present disclosure relates to an exhaust-gas treatment arrangement for an exhaust gas system of an internal combustion engine, in particular a diesel internal combustion engine.

BACKGROUND

To achieve permissible exhaust-gas values for the exhaust gases given off by internal combustion engines, in particular diesel internal combustion engines, it is known, for example, to spray a reactant, such as a urea/water solution, into the exhaust gas in order to reduce the nitrogen oxide content in an exhaust-gas treatment unit, in particular in the form of a SCR catalytic converter unit. It is also known to combine different types of catalytic converters, such as SCR catalytic converter units and oxidation catalytic converter units, in such an exhaust-gas treatment arrangement, in order to achieve as efficient as possible a reduction in the proportion of pollutants in the exhaust gas given off into the surroundings.

For the catalytic reactions that are to be conducted in various system regions of such an exhaust-gas treatment arrangement, it is necessary for the catalyst materials active in these reactions to have a sufficiently high temperature. Since, especially in starting phases of the operation of an internal combustion engine or at comparatively low ambient temperatures, the heat transported in the exhaust gas is often not sufficient to quickly reach, or reliably maintain, a temperature high enough for the catalytic reactions that are to be conducted, it is known, for example, to integrate electrically operated exhaust gas heaters in an exhaust gas system in order to transfer heat to the exhaust gas given off by an internal combustion engine, or another gas introduced in the exhaust gas system, upstream of one or more catalytically active system regions, the heat then being transported to the one or more catalytically active system regions and transferred to them by the exhaust gas, or gas.

SUMMARY

It is an object of the present disclosure to provide an exhaust-gas treatment arrangement for an exhaust gas system of an internal combustion engine, in particular diesel internal combustion engine, which makes it possible to ensure reliable heating of system regions intended for exhaust gas treatment along with a structurally straightforward and compact configuration.

According to the disclosure, this object is, for example, achieved by an exhaust-gas treatment arrangement for an exhaust gas system of an internal combustion engine, in particular diesel internal combustion engine, including at least one first exhaust-gas treatment unit and, downstream of the at least one first exhaust-gas treatment unit, an exhaust-gas treatment assembly, the at least one first exhaust-gas treatment unit and the exhaust-gas treatment assembly being arranged axially one after the other in the direction of a flow-path longitudinal axis of a flow path including the at least one first exhaust-gas treatment unit and the exhaust-gas treatment assembly, a hydrocarbon introduction assembly for introducing hydrocarbon into exhaust gas flowing in the flow path being arranged in the flow path substantially axially between the at least one first exhaust-gas treatment unit and the exhaust-gas treatment assembly, the hydrocarbon introduction assembly including an introduction ring flow channel which annularly surrounds the flow-path longitudinal axis, the introduction ring flow channel being open in an upstream flow-channel end region toward an outlet region of the at least one first exhaust-gas treatment unit and being open in a downstream flow-channel end region toward an inlet region of the exhaust-gas treatment assembly, and the hydrocarbon introduction assembly including a hydrocarbon discharging unit for discharging hydrocarbon into the introduction ring flow channel.

Providing the hydrocarbon introduction assembly formed according to the disclosure affords the possibility of introducing hydrocarbon, which releases heat as it oxidizes and therefore contributes to the heating of system regions intended for exhaust gas treatment, that is, for example, the fuel that is also to be supplied to an internal combustion engine, into the exhaust gas flow and efficiently mixing it with exhaust gas.

For efficient mixing of exhaust gas and hydrocarbon, in a compact embodiment a comparatively longer flow path contributing to mixing can be obtained in that the introduction ring flow channel includes a flow-channel inlet opening in its upstream flow-channel end region and a flow-channel outlet opening in its downstream flow-channel end region, and in that the flow-channel outlet opening is situated substantially diametrically opposite the flow-channel inlet opening with respect to the flow-path longitudinal axis. For this, it can also be provided that the flow-channel outlet opening and the flow-channel inlet opening are substantially not offset in relation to each other in the direction of the flow-path longitudinal axis, with the result that they are positioned substantially in the same axial region of the flow path.

A longer flow path, in which the mixing of hydrocarbon and exhaust gas is assisted, can also be obtained in that, at least in a region axially between the at least one first exhaust-gas treatment unit and the exhaust-gas treatment assembly, the flow path is bounded by a circumferential wall extending substantially in the direction of the flow-path longitudinal axis, and in that the introduction ring flow channel extends between the upstream flow-channel end region and the downstream flow-channel end region on an outer side of the circumferential wall.

To conduct exhaust gas exiting the at least one first exhaust-gas treatment unit into the introduction ring flow channel, a partition wall, which separates the flow path in an upstream flow-path portion adjoining the outlet region of the at least one first exhaust-gas treatment unit from a downstream flow path portion adjoining the inlet region of the exhaust-gas treatment assembly, may be arranged axially between the at least one first exhaust-gas treatment unit and the exhaust-gas treatment assembly in the flow path bounded by the circumferential wall. In this case, the upstream flow-channel end region may be open toward the upstream flow-path portion and the downstream flow-channel end region may be open toward the downstream flow-path portion.

In order to be able to reliably conduct exhaust gas exiting the at least one first exhaust-gas treatment unit into the introduction ring flow channel, it is also proposed that the flow-channel inlet opening is arranged in the circumferential wall upstream of the partition wall and the flow-channel outlet opening is arranged in the circumferential wall downstream of the partition wall.

Efficient mixing of hydrocarbon and exhaust gas in the introduction ring flow channel can be assisted further in that the hydrocarbon discharging unit discharges hydrocarbon into the introduction ring flow channel at a hydrocarbon discharging site, and in that the hydrocarbon discharging site is arranged closer to the upstream flow-channel end region than to the downstream flow-channel end region.

In this case, the hydrocarbon discharging unit may be arranged with a main discharging direction oriented substantially tangentially in relation to the introduction ring flow channel to discharge hydrocarbon, or/and the hydrocarbon discharging unit may be arranged with a main discharging direction corresponding substantially to an exhaust-gas main flow direction in the introduction ring flow channel in particular at the discharging location to discharge hydrocarbon. As a result, efficient mixing of hydrocarbon and exhaust gas in the introduction ring flow channel is assisted without a substantial increase in the flow resistance.

To further reduce the proportion of pollutants present in the exhaust gas given off by an internal combustion engine, at least one second exhaust-gas treatment unit may be arranged downstream of the exhaust-gas treatment assembly.

In order to be able to efficiently conduct a catalytic purification reaction in the at least one second exhaust-gas treatment unit, an exhaust-gas/reactant mixing section having a mixing channel, which is elongate substantially in the direction of a mixing-section longitudinal axis, and a reactant discharging unit for discharging reactant into the mixing channel may be provided downstream of the exhaust-gas treatment assembly and upstream of the at least one second exhaust-gas treatment unit.

For a compact configuration of the exhaust-gas treatment arrangement, it is proposed that the mixing-section longitudinal axis is substantially parallel to the flow-path longitudinal axis, or/and wherein the flow path and the exhaust-gas/reactant mixing section overlap one another substantially completely in the axial direction, with the result that an inlet region of the exhaust-gas/reactant mixing section is positioned substantially in the same axial region in the direction of the mixing-section longitudinal axis as an outlet region of the exhaust-gas treatment assembly, and an outlet region of the exhaust-gas/reactant mixing section is positioned substantially in the same axial region in the direction of the mixing-section longitudinal axis as an inlet region of the at least one first exhaust-gas treatment unit.

Efficient utilization of the structural volume provided for the exhaust-gas treatment arrangement can be achieved if an exhaust-gas main flow direction in the mixing channel is aligned substantially in the opposite direction to an exhaust-gas main flow direction in the flow path.

For this, it is also possible for the at least one second exhaust-gas treatment unit to be elongate in the direction of an exhaust-gas-treatment-unit longitudinal axis substantially parallel to the flow-path longitudinal axis and to be able to be flowed through substantially in the direction of the exhaust-gas-treatment-unit longitudinal axis, and the at least one second exhaust-gas treatment unit and the exhaust-gas/reactant mixing section can overlap one another substantially completely in the axial direction, with the result that the inlet region of the exhaust-gas/reactant mixing section is positioned substantially in the same axial region in the direction of the mixing-section longitudinal axis as an outlet region of the at least one second exhaust-gas treatment unit, and the outlet region of the exhaust-gas/reactant mixing section is positioned substantially in the same axial region in the direction of the mixing-section longitudinal axis as an inlet region of the at least one second exhaust-gas treatment unit.

To provide a flow connection, the inlet region of the exhaust-gas/reactant mixing section can be connected to the outlet region of the exhaust-gas treatment assembly via a first flow deflection housing, and the outlet region of the exhaust-gas/reactant mixing section can be connected to the inlet region of the at least one second exhaust-gas treatment unit via a second flow deflection housing.

To increase the exhaust-gas treatment efficiency with a compact structure, at least two second exhaust-gas treatment units, which can be flowed through in parallel, may be provided next to one another transversely in relation to the exhaust-gas-treatment-unit longitudinal axis and so as to substantially completely overlap one another in the direction of the exhaust-gas-treatment-unit longitudinal axis.

At least one exhaust-gas treatment unit may include at least one SCR catalytic converter unit or/and at least one ammonia slip catalytic converter unit. The exhaust-gas treatment assembly may also include an oxidation catalytic converter unit or/and a particle filter unit.

The disclosure also relates to an exhaust gas system for an internal combustion engine, in particular diesel internal combustion engine, including at least one exhaust-gas treatment arrangement formed according to the disclosure.

BRIEF DESCRIPTION OF DRAWINGS

The invention will now be described with reference to the drawings wherein.

DETAILED DESCRIPTION

Figure 1:
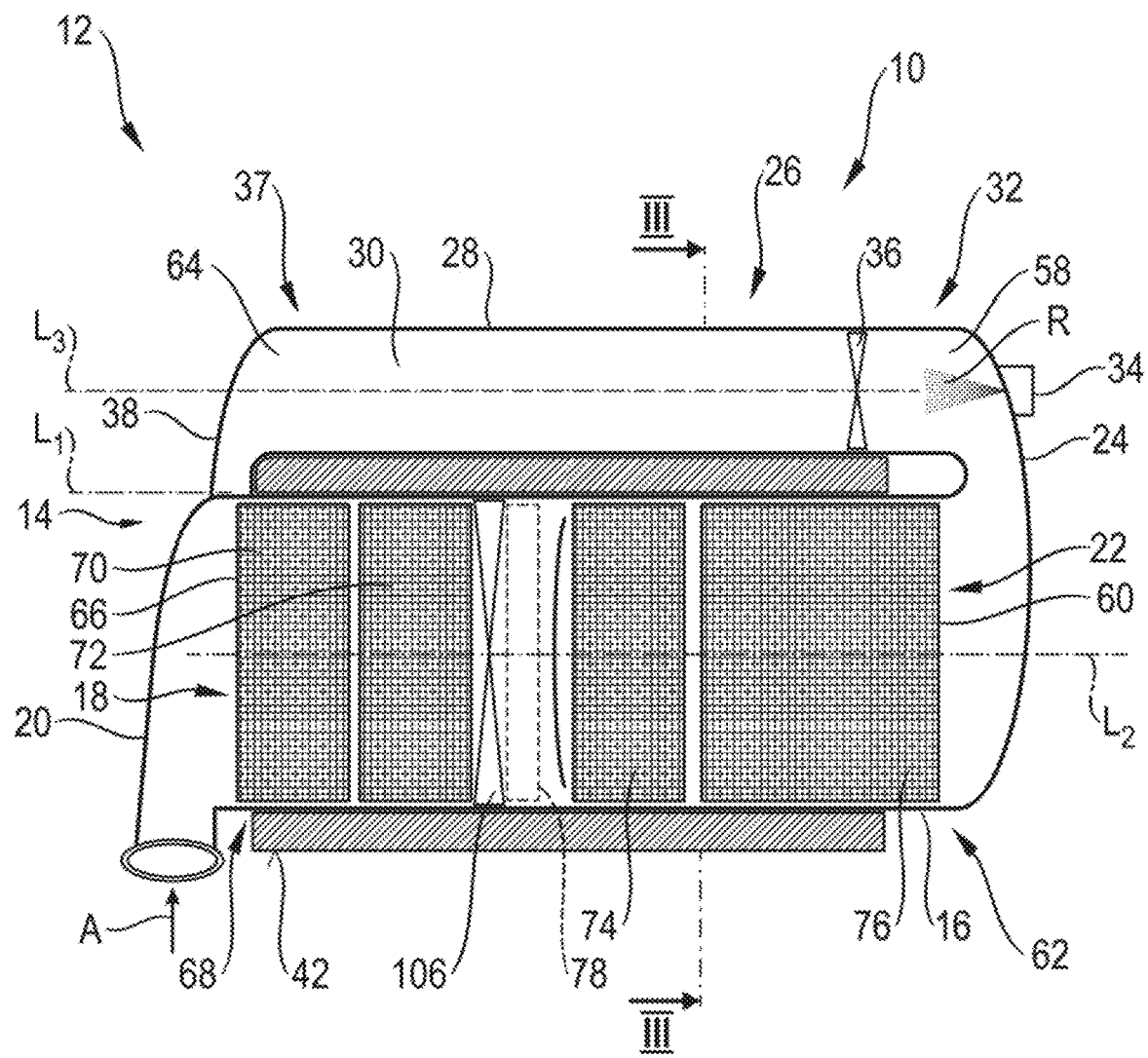
FIG. 1 shows a side view, in a partially open illustration, of an exhaust-gas treatment unit for an internal combustion engine.
Figure 2:
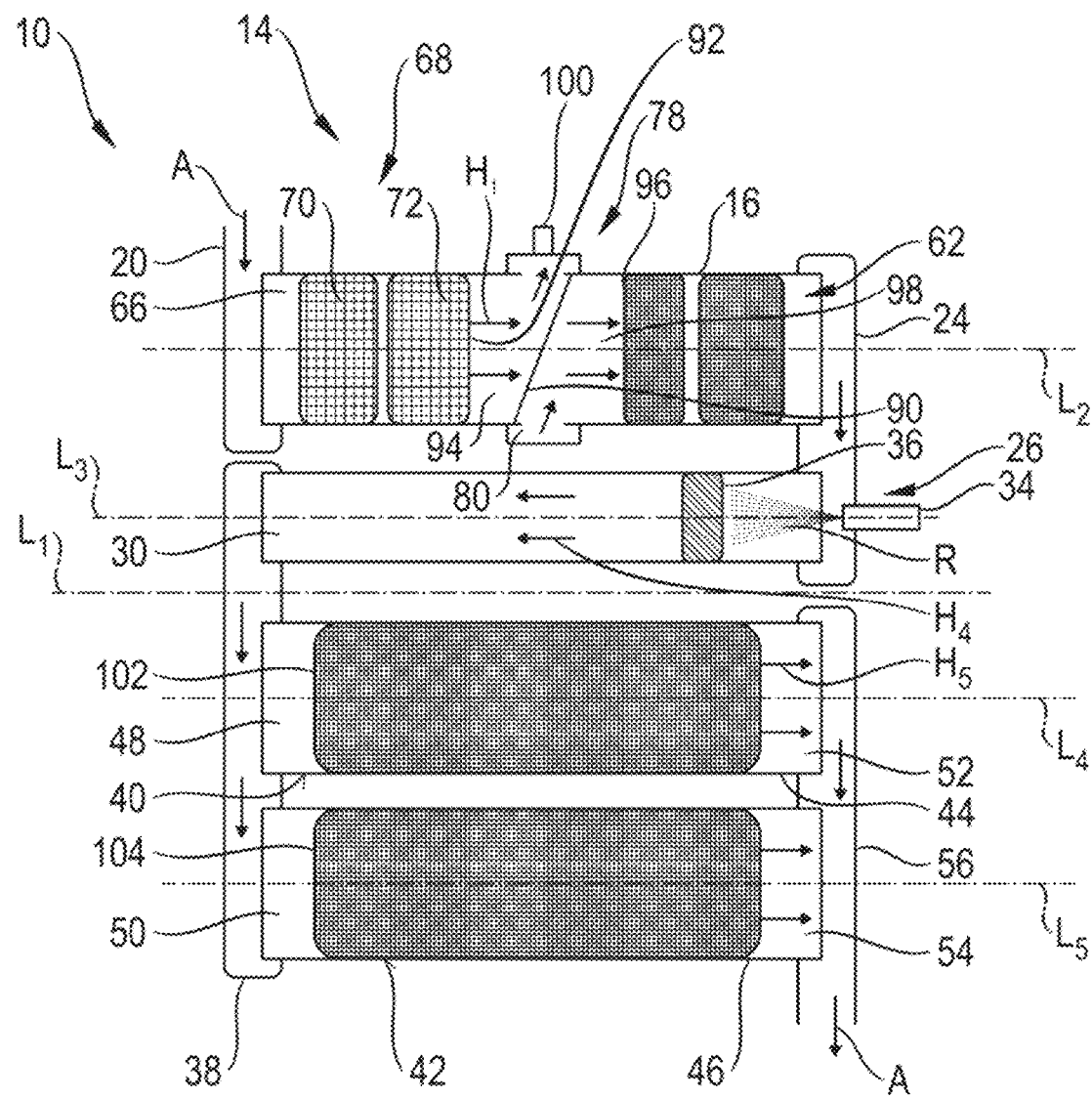
FIG. 2 shows a schematic and developed illustration of the system regions of the exhaust-gas treatment arrangement of FIG. 1, which follow one another in the flow direction and overlap one another substantially axially.
Figure 3:
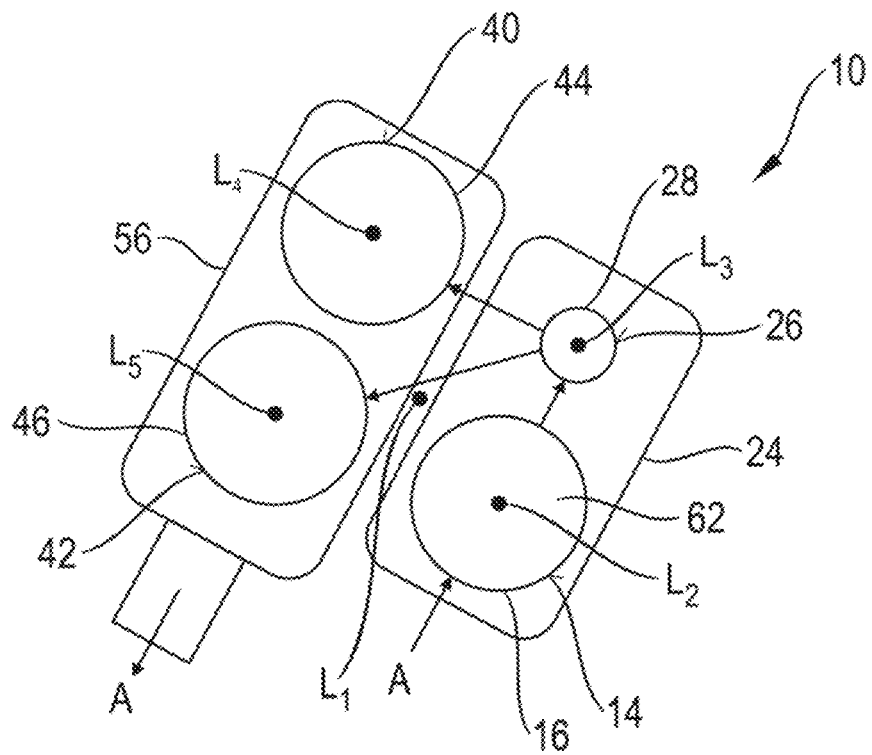
FIG. 3 shows a schematic cross-sectional view of the exhaust-gas treatment arrangement of FIG. 1 in section along a line III-III in FIG. 1; and, FIG. 4 shows a partial cross-sectional view of a flow path of the exhaust-gas treatment arrangement of FIG. 1 in the region of a hydrocarbon introduction assembly.

An exhaust-gas treatment arrangement 10 for an exhaust gas system 12, in particular for a diesel internal combustion engine, can be seen in a side view in FIG. 1. Such an exhaust-gas treatment arrangement 10 can be provided for example in an exhaust gas system 12 of a utility vehicle or a truck. FIGS. 2 and 3 illustrate the exhaust-gas treatment arrangement 10 in a schematic view, with FIG. 2 illustrating a circumferential development of the exhaust-gas treatment arrangement 10, which is fundamentally elongate in the direction of an exhaust-gas-treatment-arrangement longitudinal axis $L_1$.

The exhaust-gas treatment arrangement 10 includes a flow path which is denoted 14 in general, is elongate in the direction of a flow-path longitudinal axis $L_2$, and has a substantially tubular flow-path housing 16 which is in one piece or composed of multiple parts. An introduction housing 20 adjoins the flow-path housing 16 at an upstream end region 18 of the flow path 14. Exhaust gas A given off by an internal combustion engine is introduced into the exhaust-gas treatment arrangement 10 or the flow path 14 via the introduction housing 20. A first deflection housing 24 adjoins the flow-path housing 16 in a downstream end region 22 of the flow path 14. In the first deflection housing 24, the exhaust gas A flowing through, or exiting, the flow path 14 is deflected by approximately 180° and introduced into an exhaust-gas/reactant mixing section 26. The exhaust-gas/reactant mixing section 26 includes a mixing channel 30, which is elongate in the direction of a mixing-section longitudinal axis $L_3$, in a tubular mixing-section housing 28. A reactant discharging unit 34, which in general is also referred to as injector and which sprays a reactant R, for example a urea/water solution, into the mixing channel 30, is provided at an upstream end region 32 of the exhaust-gas/reactant mixing section 26, for example carried on the first deflection housing 24. To assist the mixing of exhaust gas A and reactant R, a mixer 36 including for example a plurality of baffle plates or the like may be arranged in the mixing-section housing 28.

The mixing-section housing 28 adjoins a second deflection housing 38 in a downstream end region 37 of the exhaust-gas/reactant mixing section 26. The exhaust gas flow is deflected again by approximately 180° in the second deflection housing 38. In the embodiment illustrated, the exhaust gas is introduced into two second exhaust-gas treatment units 40, 42, which can be flowed through in parallel, via the second deflection housing 38. Each of the second exhaust-gas treatment units 40, 42 includes a tubular exhaust-gas-treatment-unit housing 44, 46 which is elongate in the direction of a respective exhaust-gas-treatment-unit longitudinal axis $L_4$, $L_5$. A respective upstream end region of the exhaust-gas-treatment-unit housing 44, 46 provides a respective inlet region 48, 50 of the second exhaust-gas treatment units 40, 42, and a respective downstream end region of the exhaust-gas-treatment-unit housing 44, 46 provides a respective outlet region 52, 54 of the second exhaust-gas treatment units 40, 42. They are open toward a discharge housing 56, via which the exhaust gas A treated in the exhaust-gas treatment arrangement 10 leaves the exhaust-gas treatment arrangement 10 toward further system regions of the exhaust gas system 12, for example one or more noise dampers or the like.

FIGS. 1 and 3 show that, in the exhaust-gas treatment arrangement 10, the flow path 14, the exhaust-gas/reactant mixing section 26 and the second exhaust-gas treatment units 40, 42 are positioned in such a way that their longitudinal axes $L_2$, $L_3$, $L_4$, $L_5$ are substantially parallel to one another and to the exhaust-gas-treatment-arrangement longitudinal axis $L_1$ and that they overlap substantially completely in the axial direction. This means that an inlet region 58 of the exhaust-gas/reactant mixing section 26 is substantially in the same axial region as an outlet region 60 of an exhaust-gas treatment assembly 62 arranged in the flow path 14, and that an outlet region 64 of the exhaust-gas/reactant mixing section 26 is substantially in the same axial region as an inlet region 66 of an exhaust-gas treatment unit 68 arranged in the flow path 14. Similarly, the outlet region 64 of the exhaust-gas/reactant mixing section 26 is substantially in the same axial region as the inlet regions 48, 50 of the second exhaust-gas treatment units 40, 42, whereas the inlet region 58 of the exhaust-gas/reactant mixing section 26 is substantially in the same axial region as the outlet regions 52, 54 of the second exhaust-gas treatment units 40, 42.

In the embodiment illustrated, the exhaust-gas treatment unit 68 arranged in the flow path 14, or in the flow-path housing 16, includes a SCR catalytic converter unit 70 and an ammonia slip catalytic converter unit 72 that follow one another in the flow direction, or axially in the direction of the flow-path longitudinal axis $L_2$. The exhaust gas A introduced into the flow path 14 via the introduction housing 20 flows through the two catalytic converter units 70, 72 of the first exhaust-gas treatment unit 68 substantially in an exhaust-gas main flow direction $H_1$ in the flow path 14, with the exhaust-gas main flow direction $H_1$ in the flow path 14 being oriented substantially parallel to the flow-path longitudinal axis $L_2$. Of course, flow direction components which differ from this exhaust-gas main flow direction $H_1$ may be present, for example in regions in which swirling or turbulence occurs. A further reactant discharging unit may be arranged in the exhaust gas system 12 upstream of the exhaust-gas treatment arrangement 10 or the SCR catalytic converter unit 70, in order to introduce a reactant, for example a urea/water solution, into the exhaust gas flow upstream of the SCR catalytic converter unit 70.

An oxidation catalytic converter 74, in particular diesel oxidation catalytic converter unit, and a particle filter unit 76 of the exhaust-gas treatment assembly 62 are arranged one after the other in the flow direction downstream of the two catalytic converter units 70, 72 of the first exhaust-gas treatment unit 68. The exhaust gas A flowing through the flow path 14 flows substantially in the exhaust-gas main flow direction $H_1$ firstly through the oxidation catalytic converter unit 74 and then through the particle filter unit 76, before it is deflected by the first deflection housing 24 toward the exhaust-gas/reactant mixing section 26.

It should be pointed out that, in the case of the exhaust-gas treatment arrangement 10, both the first exhaust-gas treatment unit 68 and the exhaust-gas treatment assembly 62 may have different structures to that in the embodiment illustrated. Thus, for example, the first exhaust-gas treatment unit 68 could include only the SCR catalytic converter unit 70. The exhaust-gas treatment assembly 62 could, for example, include only the oxidation catalytic converter unit 74.

Figure 4:
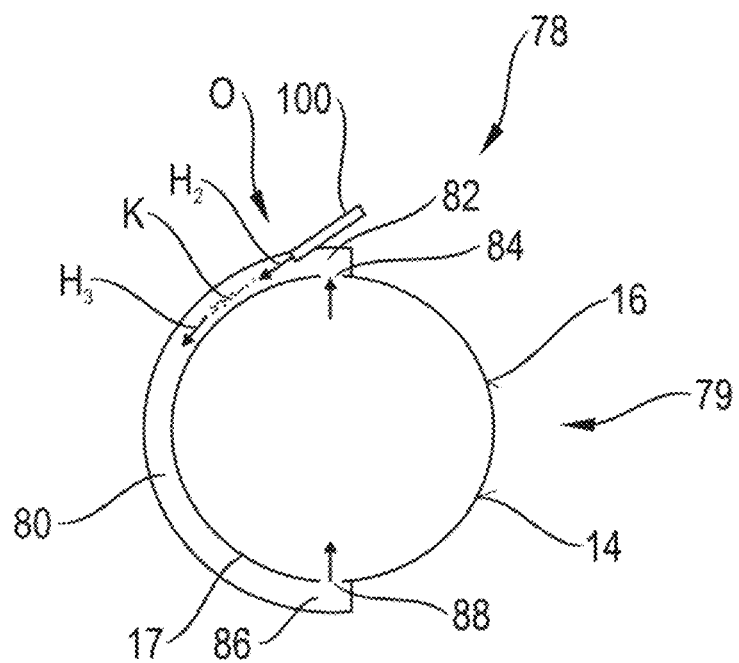

A hydrocarbon introduction assembly 78, which is indicated only schematically in FIG. 1, is provided in the flow direction, or axially, substantially between the first exhaust-gas treatment unit 68 and the exhaust-gas treatment assembly 62. The hydrocarbon introduction assembly 78 includes an introduction ring flow channel 80, which can be seen in FIGS. 2 and 4. The introduction ring flow channel 80 is guided substantially on the outer side of the flow-path housing 16, which provides a circumferential wall 17 of the flow path 14 in particular in the region of the hydrocarbon introduction assembly 78, and extends around the flow-path longitudinal axis $L_2$ in an angular range of approximately 180°.

It should be pointed out that the hydrocarbon introduction assembly 78 may be provided by a separate, annular housing 79, which provides a region of the flow-path housing 16 or of the circumferential wall 17 axially between the first exhaust-gas treatment unit 68 and the exhaust-gas treatment assembly 62 and delimits the introduction ring flow channel 80 both radially outward, radially inward and in the two circumferential directions.

The introduction ring flow channel 80 includes an upstream flow-channel end region 82, in which the introduction ring flow channel 80 is open by way of a flow-channel inlet opening 84 arranged for example in the flow-path housing 16. The inlet ring flow channel 80 is open by way of a flow-channel outlet opening 88 in a downstream flow-channel end region 86. The flow-channel inlet opening 84 and the flow-channel outlet opening 88 are situated substantially diametrically opposite each other with respect to the flow-path longitudinal axis $L_2$ and are, as depicted in FIG. 2, substantially in the same axial region, that is, are substantially not offset in relation to each other in the direction of the flow-path longitudinal axis $L_2$.

In the flow-path housing 16 there is arranged a partition wall 90, which is oblique with respect to the flow-path longitudinal axis $L_2$ and subdivides the flow path 14 into an upstream flow-path portion 94, which adjoins an outlet region 92 of the first exhaust-gas treatment unit 68, and a downstream flow-path portion 98, which adjoins an inlet region 96 of the exhaust-gas treatment assembly 62, in the region axially between the first exhaust-gas treatment unit 68 and the exhaust-gas treatment assembly 62. The exhaust gas A exiting the first exhaust-gas treatment unit 68 substantially in the direction of the exhaust-gas main flow direction $H_1$ in the flow path 14 is deflected by the partition wall 90 and flows toward the flow-channel inlet opening 84, by way of which the introduction ring flow channel 80 is open toward the upstream flow-path portion 94. The exhaust gas entering the introduction ring flow channel 80 flows substantially in the circumferential direction toward the flow-channel outlet opening 88 in the introduction ring flow channel 80 and enters the downstream flow path 98 through this flow-channel outlet opening.

A hydrocarbon discharging unit 100 is provided close to the upstream flow-channel end region 82. The hydrocarbon discharging unit 100 discharges liquid hydrocarbon K substantially in a main discharge direction $H_2$, which corresponds substantially to an exhaust-gas main flow direction $H_3$ in the region of a discharging site O, that is, in that region where the hydrocarbon discharging unit 100 sprays the liquid hydrocarbon K into the introduction ring flow channel 80 substantially in the form of a spray mist or the like. As it flows along the introduction ring flow channel 80, the hydrocarbon K can be mixed with the exhaust gas flowing in the introduction ring flow channel 80, with the result that a mixture of hydrocarbon and exhaust gas enters the downstream flow-path portion 98 in the region of the flow-channel outlet opening 88 and in particular flows toward the oxidation catalytic converter unit 74.

In order to assist the radially outward flow of exhaust gas into the introduction ring flow channel 80, a swirling-flow generating unit 106, which circumferentially deflects the exhaust gas exiting the first exhaust-gas treatment unit 68 and subjects it to a circumferential-flow-direction component that more intensively conducts the exhaust gas radially, may be arranged downstream of the first exhaust-gas treatment unit 68.

Oxidizing the hydrocarbon K transported in the exhaust gas A in the oxidation catalytic converter unit 74 causes a release of heat, which for the one part contributes to heating the oxidation catalytic converter unit 74 and thus ensures that the latter is quickly brought to the operating temperature required for the catalytic reaction or is efficiently kept at this temperature. For the other part, some of this heat can be borne toward the downstream system regions, in particular the exhaust-gas/reactant mixing section 26 and the second exhaust-gas treatment units 40, 42, by the exhaust gas flowing through the oxidation catalytic converter unit 74. This can contribute to increased evaporation of the reactant R, which is sprayed-in in liquid form, in the exhaust-gas/reactant mixing section 26. In the second exhaust-gas treatment units 40, 42, their respective SCR catalytic converter units 102, 104 can be efficiently heated and brought to the temperature required for the SCR reaction more quickly, or kept at this temperature.

The structure according to the disclosure of an exhaust-gas treatment arrangement ensures, both by virtue of the addition of hydrocarbon to the exhaust-gas flow and by virtue of efficient mixing of the hydrocarbon with the exhaust gas flowing in the exhaust-gas treatment arrangement, that oxidation of the hydrocarbon distributed over a large surface area makes it possible to release heat substantially uniformly, and the heat can be used to heat various system regions of the exhaust-gas treatment arrangement 10 that are intended for conducting catalytic reactions. The integration of the hydrocarbon introduction assembly in the flow path in the manner described above achieves, or maintains, a compact configuration of the exhaust-gas treatment arrangement which allows for the flow principle that the exhaust-gas main flow direction $H_1$ in the flow path also including the hydrocarbon introduction assembly is aligned substantially in the opposite direction to an exhaust-gas main flow direction $H_4$ in the exhaust-gas/reactant mixing section, while an exhaust-gas main flow direction $H_5$ in the second exhaust-gas treatment units is aligned in the same direction as the exhaust-gas main flow direction $H_1$ in the flow path, but in the opposite direction to the exhaust-gas main flow direction $H_4$ in the exhaust-gas/reactant mixing section. This makes it possible to ensure that the statutory limit values for proportions of pollutants in the exhaust gas can be achieved or maintained under a wide variety of different operating circumstances of an internal combustion engine or the exhaust gas system together with an axially very compact structure owing to the introduction of hydrocarbon and owing to the efficient mixing of the hydrocarbon with the exhaust gas.

It is understood that the foregoing description is that of the preferred embodiments of the invention and that various changes and modifications may be made thereto without departing from the spirit and scope of the invention as defined in the appended claims.

The invention claimed is:

1. An exhaust-gas treatment arrangement for an exhaust gas system of an internal combustion engine, the exhaust-gas treatment arrangement comprising:
   a first exhaust-gas treatment unit;
   an exhaust-gas treatment assembly downstream of said first exhaust-gas treatment unit;
   said first exhaust-gas treatment unit and said exhaust-gas treatment assembly being arranged axially one after another in a direction of a flow-path longitudinal axis ($L_2$) of a flow path including said first exhaust-gas treatment unit and said exhaust-gas treatment assembly;
   a hydrocarbon introduction assembly arranged in said flow path axially between said first exhaust-gas treatment unit and said exhaust-gas treatment assembly for introducing hydrocarbon into exhaust gas flowing in said flow path downstream of said first exhaust-gas treatment unit and upstream of said exhaust-gas treatment assembly;
   said hydrocarbon introduction assembly having an introduction ring flow channel annularly surrounding said flow-path longitudinal axis ($L_2$);
   said introduction ring flow channel being open in an upstream flow-channel end region toward an outlet region of said first exhaust-gas treatment unit and being open in a downstream flow-channel end region toward an inlet region of said exhaust-gas treatment assembly; and, said hydrocarbon introduction assembly having a hydrocarbon discharging unit for discharging hydrocarbon into said introduction ring flow channel.

2. The exhaust-gas treatment arrangement of claim 1, wherein said introduction ring flow channel defines a flow-channel inlet opening in said upstream flow-channel end region and a flow-channel outlet opening in said downstream flow-channel end region; and, at least one of said flow-channel outlet opening is situated diametrically opposite said flow-channel inlet opening with respect to said flow-path longitudinal axis ($L_2$) and said flow-channel outlet opening and said flow-channel inlet opening are not mutually offset in a direction of said flow-path longitudinal axis ($L_2$).

3. The exhaust-gas treatment arrangement of claim 1, wherein, at least in a region axially between said first exhaust-gas treatment unit and said exhaust-gas treatment assembly, said flow path is bounded by a circumferential wall extending in a direction of said flow-path longitudinal axis ($L_2$); and, said introduction ring flow channel extends between said upstream flow-channel end region and said downstream flow-channel end region on an outer side of said circumferential wall.

4. The exhaust-gas treatment arrangement of claim 3, further comprising:
a partition wall, which separates said flow path in an upstream flow-path portion adjoining said outlet region of said first exhaust-gas treatment unit from a downstream flow-path portion adjoining said inlet region of said exhaust-gas treatment assembly, is arranged axially between said first exhaust-gas treatment unit and said exhaust-gas treatment assembly in said flow path bounded by said circumferential wall; and,
said upstream flow-channel end region being open toward said upstream flow-path portion and said downstream flow-channel end region is open toward said downstream flow-path portion.

5. The exhaust-gas treatment arrangement of claim 4, wherein said introduction ring flow channel defines a flow-channel inlet opening in said upstream flow-channel end region and a flow-channel outlet opening in said downstream flow-channel end region; at least one of said flow-channel outlet opening is situated diametrically opposite said flow-channel inlet opening with respect to said flow-path longitudinal axis ($L_2$) and said flow-channel outlet opening and said flow-channel inlet opening are not mutually offset in a direction of said flow-path longitudinal axis ($L_2$); and, said flow-channel inlet opening is arranged in said circumferential wall upstream of said partition wall and said flow-channel outlet opening is arranged in said circumferential wall downstream of said partition wall.

6. The exhaust-gas treatment arrangement of claim 1, wherein said hydrocarbon discharging unit is configured to discharge hydrocarbon into said introduction ring flow channel at a hydrocarbon discharging site; and, said hydrocarbon discharging site is arranged closer to said upstream flow-channel end region than to said downstream flow-channel end region.

7. The exhaust-gas treatment arrangement of claim 1, wherein at least one of:
said hydrocarbon discharging unit is arranged with a main discharging direction ($H_2$) oriented tangentrically in relation to said introduction ring flow channel to discharge hydrocarbon; and, said hydrocarbon discharging unit is arranged with said main discharging direction ($H_2$) corresponding to an exhaust-gas main flow direction ($H_3$) in said introduction ring flow channel to discharge hydrocarbon.

8. The exhaust-gas treatment arrangement of claim 1, further comprising a second exhaust-gas treatment unit arranged downstream of said exhaust-gas treatment assembly.

9. The exhaust-gas treatment arrangement of claim 8, further comprising:
an exhaust-gas/reactant mixing section having a mixing channel elongated in a direction of a mixing-section longitudinal axis ($L_3$);
a reactant discharging unit for discharging reactant into said mixing channel; and,
said reactant discharging unit being provided downstream of said exhaust-gas treatment assembly and upstream of said second exhaust-gas treatment unit.

10. The exhaust-gas treatment arrangement of claim 9, wherein said mixing-section longitudinal axis ($L_3$) is parallel to said longitudinal axis ($L_2$) of said flow-path, and/or wherein said flow path and said exhaust-gas/reactant mixing section overlap one another completely in axial direction causing an inlet region of said exhaust-gas/reactant mixing section to be positioned in a same axial region in the direction of said mixing-section longitudinal axis ($L_3$) as an outlet region of said exhaust-gas treatment assembly, and an outlet region of said exhaust-gas/reactant mixing section is positioned in the same axial region in the direction of said mixing-section longitudinal axis ($L_3$) as an inlet region of said first exhaust-gas treatment unit.

11. The exhaust-gas treatment arrangement of claim 9, wherein an exhaust-gas main flow direction ($H_4$) in said mixing channel is aligned in an opposite direction to an exhaust-gas main flow direction ($H_1$) in said flow path.

12. The exhaust-gas treatment arrangement of claim 9, wherein said second exhaust-gas treatment unit is elongated in a direction of an exhaust-gas-treatment-unit longitudinal axis ($L_4$, $L_5$) parallel to said flow-path longitudinal axis ($L_2$) and can be flowed through in the direction of said exhaust-gas-treatment-unit longitudinal axis ($L_4$, $L_5$), and/or wherein said second exhaust-gas treatment unit and said exhaust-gas/reactant mixing section overlap one another in axial direction causing an inlet region of said exhaust-gas/reactant mixing section to be positioned in a same axial region in the direction of said mixing-section longitudinal axis ($L_3$) as an outlet region of said second exhaust-gas treatment unit, and said outlet region of said exhaust-gas/reactant mixing section is positioned in the same axial region in the direction of said mixing-section longitudinal axis ($L_3$) as an inlet region of said second exhaust-gas treatment unit.

13. The exhaust-gas treatment arrangement of claim 12, further comprising first and second flow deflection housings; and, wherein said inlet region of said exhaust-gas/reactant mixing section is connected to said outlet region of said exhaust-gas treatment assembly via said first flow deflection housing and said outlet region of said exhaust-gas/reactant mixing section is connected to said inlet region of said second exhaust-gas treatment unit via said second flow deflection housing.

14. The exhaust-gas treatment arrangement of claim 12, wherein two second exhaust-gas treatment units, which can be flowed through in parallel, are provided next to one another transversely in relation to said exhaust-gas-treatment-unit longitudinal axis ($L_4$, $L_5$) and so as to completely overlap one another in a direction of said exhaust-gas-treatment-unit longitudinal axis ($L_4$, $L_5$).

15. The exhaust-gas treatment arrangement of claim 8, wherein at least one of said exhaust-gas treatment units includes an SCR catalytic converter unit and/or at least one ammonia slip catalytic converter unit and/or wherein said exhaust-gas treatment assembly includes an oxidation catalytic converter unit and/or a particle filter unit.

16. The exhaust-gas treatment arrangement of claim 1, wherein the internal combustion engine is a diesel internal combustion engine.

17. An exhaust gas system for an internal combustion engine, the exhaust gas system comprising:
- at least one exhaust-gas treatment arrangement having a first exhaust-gas treatment unit and an exhaust-gas treatment assembly downstream of said first exhaust-gas treatment unit;
- said first exhaust-gas treatment unit and said exhaust-gas treatment assembly being arranged axially one after the other in a direction of a flow-path longitudinal axis ($L_2$) of a flow path including said first exhaust-gas treatment unit and said exhaust-gas treatment assembly;
- a hydrocarbon introduction assembly arranged in said flow path axially between said first exhaust-gas treatment unit and said exhaust-gas treatment assembly for introducing hydrocarbon into exhaust gas flowing in said flow path downstream of said first exhaust-gas treatment unit and upstream of said exhaust-gas treatment assembly;
- said hydrocarbon introduction assembly having an introduction ring flow channel annularly surrounding said flow-path longitudinal axis ($L_2$);
- said introduction ring flow channel being open in an upstream flow-channel end region toward an outlet region of said first exhaust-gas treatment unit and being open in a downstream flow-channel end region toward an inlet region of said exhaust-gas treatment assembly; and,
- said hydrocarbon introduction assembly having a hydrocarbon discharging unit for discharging hydrocarbon into said introduction ring flow channel.

18. The exhaust gas system of claim 17, wherein the internal combustion engine is a diesel internal combustion engine.

19. An exhaust-gas treatment arrangement for an exhaust gas system of an internal combustion engine, the exhaust-gas treatment arrangement comprising:
- a first exhaust-gas treatment unit;
- an exhaust-gas treatment assembly downstream of said first exhaust-gas treatment unit;
- said first exhaust-gas treatment unit and said exhaust-gas treatment assembly being arranged axially one after another in a direction of a flow-path longitudinal axis ($L_2$) of a flow path including said first exhaust-gas treatment unit and said exhaust-gas treatment assembly;
- a hydrocarbon introduction assembly for introducing hydrocarbon into exhaust gas flowing in said flow path;
- said hydrocarbon introduction assembly being arranged in said flow path axially between said first exhaust-gas treatment unit and said exhaust-gas treatment assembly;
- said hydrocarbon introduction assembly having an introduction ring flow channel annularly surrounding said flow-path longitudinal axis ($L_2$);
- said introduction ring flow channel being open in an upstream flow-channel end region toward an outlet region of said first exhaust-gas treatment unit and being open in a downstream flow-channel end region toward an inlet region of said exhaust-gas treatment assembly; and,
- said hydrocarbon introduction assembly having a hydrocarbon discharging unit for discharging hydrocarbon into said introduction ring flow channel; and
- wherein, at least in a region axially between said first exhaust-gas treatment unit and said exhaust-gas treatment assembly, said flow path is bounded by a circumferential wall extending in a direction of said flow-path longitudinal axis ($L_2$);
- and, said introduction ring flow channel extends between said upstream flow-channel end region and said downstream flow-channel end region on an outer side of said circumferential wall.

20. The exhaust-gas treatment arrangement of claim 19, further comprising:
- a partition wall, which separates said flow path in an upstream flow-path portion adjoining said outlet region of said first exhaust-gas treatment unit from a downstream flow-path portion adjoining said inlet region of said exhaust-gas treatment assembly, is arranged axially between said first exhaust-gas treatment unit and said exhaust-gas treatment assembly in said flow path bounded by said circumferential wall; and,
- said upstream flow-channel end region being open toward said upstream flow-path portion and said downstream flow-channel end region is open toward said downstream flow-path portion.

21. The exhaust-gas treatment arrangement of claim 20, wherein said introduction ring flow channel defines a flow-channel inlet opening in said upstream flow-channel end region and a flow-channel outlet opening in said downstream flow-channel end region; at least one of said flow-channel outlet opening is situated diametrically opposite said flow-channel inlet opening with respect to said flow-path longitudinal axis ($L_2$) and said flow-channel outlet opening and said flow-channel inlet opening are not mutually offset in a direction of said flow-path longitudinal axis ($L_2$); and, said flow-channel inlet opening is arranged in said circumferential wall upstream of said partition wall and said flow-channel outlet opening is arranged in said circumferential wall downstream of said partition wall.

22. An exhaust gas system for an internal combustion engine, the exhaust gas system comprising:
- at least one exhaust-gas treatment arrangement having a first exhaust-gas treatment unit and an exhaust-gas treatment assembly downstream of said first exhaust-gas treatment unit;
- said first exhaust-gas treatment unit and said exhaust-gas treatment assembly being arranged axially one after the other in a direction of a flow-path longitudinal axis ($L_2$) of a flow path including said first exhaust-gas treatment unit and said exhaust-gas treatment assembly;
- said exhaust-gas treatment arrangement further having a hydrocarbon introduction assembly for introducing hydrocarbon into exhaust gas flowing in said flow path;
- said hydrocarbon introduction assembly being arranged in said flow path axially between said first exhaust-gas treatment unit and said exhaust-gas treatment assembly;
- said hydrocarbon introduction assembly having an introduction ring flow channel annularly surrounding said flow-path longitudinal axis ($L_2$);
- said introduction ring flow channel being open in an upstream flow-channel end region toward an outlet region of said first exhaust-gas treatment unit and being open in a downstream flow-channel end region toward an inlet region of said exhaust-gas treatment assembly; and, said hydrocarbon introduction assembly having a hydrocarbon discharging unit for discharging hydrocarbon into said introduction ring flow channel; and, wherein, at least in a region axially between said first exhaust-gas treatment unit and said exhaust-gas treatment assembly, said flow path is bounded by a circumferential wall extending in a direction of said flow-path longitudinal axis ($L_2$); and, said introduction ring flow channel extends between said upstream flow-channel end region and said downstream flow-channel end region on an outer side of said circumferential wall.

* * * * *